(12) United States Patent
Gretz et al.

(10) Patent No.: US 11,651,161 B2
(45) Date of Patent: May 16, 2023

(54) AUTOMATED DETECTION OF REASONING IN ARGUMENTS

(71) Applicant: International Business Machines Corporation, Armonk, NY (US)

(72) Inventors: Avishai Gretz, Ramat-Gan (IL); Edo Cohen-Karlik, Tel-Aviv (IL); Noam Slonim, Jerusalem (IL); Assaf Toledo, Ramat-Gan (IL)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 16/789,464

(22) Filed: Feb. 13, 2020

(65) Prior Publication Data

US 2021/0256214 A1  Aug. 19, 2021

(51) Int. Cl.
| | |
|---|---|
| *G06F 40/30* | (2020.01) |
| *G06F 40/284* | (2020.01) |
| *G06N 7/00* | (2006.01) |
| *G06N 20/00* | (2019.01) |
| *G06N 5/04* | (2006.01) |
| *G10L 15/16* | (2006.01) |
| *G10L 15/183* | (2013.01) |

(Continued)

(52) U.S. Cl.
CPC ............ *G06F 40/30* (2020.01); *G06F 40/284* (2020.01); *G06N 5/045* (2013.01); *G06N 7/005* (2013.01); *G06N 20/00* (2019.01); *G10L 15/16* (2013.01); *G10L 15/183* (2013.01); *G06N 3/0454* (2013.01)

(58) Field of Classification Search
CPC ....... G06F 40/30; G06F 40/284; G06N 5/045; G06N 7/005; G06N 20/00; G06N 3/0454; G10L 15/16; G10L 15/183
USPC .......................................................... 706/12
See application file for complete search history.

(56) References Cited

U.S. PATENT DOCUMENTS

| | | | | |
|---|---|---|---|---|
| 10,133,791 | B1 * | 11/2018 | Chan ....................... | G06F 16/93 |
| 10,229,675 | B2 * | 3/2019 | Scheiner ............. | G06F 16/3329 |
| 10,402,495 | B1 * | 9/2019 | Rush ....................... | G06F 40/30 |

(Continued)

OTHER PUBLICATIONS

A. Radford et al., "Language Models are Unsupervised Multitask Learners," Online at https://cdn.openai.com/better-language-models/language_models_are_unsupervised_multitask_learners.pdf, Feb. 2019.

(Continued)

*Primary Examiner* — Edwin S Leland, III
(74) *Attorney, Agent, or Firm* — Dvir Gassner

(57) ABSTRACT

Automated detection of reasoning in arguments. A training set is generated by: obtaining multiple arguments, each comprising one or more sentences provided as digital text; automatically estimating a probability that each of the arguments includes reasoning, wherein the estimating comprises applying a contextual language model to each of the arguments; automatically labeling as positive examples those of the arguments which have a relatively high probability to include reasoning; and automatically labeling as negative examples those of the arguments which have a relatively low probability to include reasoning. Based on the (Continued)

generated training set, a machine learning classifier is automatically trained to estimate a probability that a new argument includes reasoning. The trained machine learning classifier is applied to the new argument, to estimate a probability that the new argument includes reasoning.

19 Claims, 3 Drawing Sheets

(51) Int. Cl.
    *G06N 5/045*           (2023.01)
    *G06N 3/04*            (2023.01)

(56) References Cited

U.S. PATENT DOCUMENTS

| | | | | |
|---|---|---|---|---|
| 10,607,598 | B1* | 3/2020 | Larson | G10L 15/063 |
| 2007/0183655 | A1* | 8/2007 | Konig | G06K 9/6282 |
| | | | | 382/224 |
| 2017/0017635 | A1* | 1/2017 | Leliwa | G06F 40/258 |
| 2017/0270100 | A1* | 9/2017 | Audhkhasi | G06F 40/30 |
| 2018/0357220 | A1* | 12/2018 | Galitsky | G06N 5/022 |
| 2018/0357221 | A1* | 12/2018 | Galitsky | G06F 40/35 |
| 2019/0138595 | A1* | 5/2019 | Galitsky | G06F 40/253 |
| 2019/0272323 | A1* | 9/2019 | Galitsky | G06F 40/253 |
| 2019/0311641 | A1* | 10/2019 | Plant | G09B 5/06 |
| 2020/0401661 | A1* | 12/2020 | Kota | G06N 20/00 |
| 2021/0019339 | A1* | 1/2021 | Ghulati | G06Q 50/00 |
| 2021/0103775 | A1* | 4/2021 | Glass | G06F 40/284 |
| 2021/0182663 | A1* | 6/2021 | Galuten | G06N 5/04 |
| 2021/0256214 | A1* | 8/2021 | Gretz | G06F 40/30 |
| 2022/0130160 | A1* | 4/2022 | Feng | G06V 30/147 |
| 2022/0138559 | A1* | 5/2022 | Gangi Reddy | G06N 3/08 |
| | | | | 706/25 |

OTHER PUBLICATIONS

A. Sorgente et al., "Automatic extraction of cause-effect relations in Natural Language Text," Proceedings of the 7th International Workshop on Information Filtering and Retrieval, Dec. 2013.

G. Sui et al., "Joker at SemEval-2018 Task 12: The Argument Reasoning Comprehension with Neural Attention," Proceedings of the 12th International Workshop on Semantic Evaluation (SemEval-2018), pp. 1129-1132.

I. Habernal et al.,"The Argument Reasoning Comprehension Task: Identification and Reconstruction of Implicit Warrants," Proceedings of NAACL-HLT 2018, pp. 1930-1940.

J. Camacho-Collados et al., "From Word to Sense Embeddings: A Survey on Vector Representations of Meaning," Journal of Artificial Intelligence Research 63 (2018) 743-788.

J. Devlin et al., "BERT: Pre-training of Deep Bidirectional Transformers for Language Understanding," arXiv:1810.04805v2 [cs.CL], May 24, 2019.

L. Aina et al., "Putting words in context: LSTM language models and lexical ambiguity," arXiv:1906.05149v1 [cs.CL], Jun. 12, 2019.

O. Biran et al., "Identifying justifications in written dialogs by classifying text as argumentative," International Journal of Semantic Computing 05(04), Dec. 2011.

T. Dasgupta et al., "Automatic Extraction of Causal Relations from Text using Linguistically Informed Deep Neural Networks," Proceedings of the SIGDIAL 2018 Conference, pp. 306-316, Jul. 2018.

Z. Yang et al., "XLNet: Generalized Autoregressive Pretraining for Language Understanding," arXiv:1906.08237v1 [cs.CL], Jun. 19, 2019.

* cited by examiner

AUTOMATED DETECTION OF REASONING IN ARGUMENTS

BACKGROUND

The invention relates to the field of Natural Language Processing (NLP).

NLP is a field of computer science, artificial intelligence, and linguistics, concerned with the interaction between computers and human (natural) languages. As such, NLP is often involved with natural language understanding, i.e., enabling computers to derive meaning from human or natural language input, and to automatically generate natural language.

NLP mechanisms generally perform one or more types of lexical or dependency parsing analysis, including morphological analysis, syntactical analysis or parsing, semantic analysis, pragmatic analysis, or other types of analyses directed to understanding textual content. In morphological analysis, the NLP mechanisms analyze individual words and punctuation to determine the part of speech associated with the words. In syntactical analysis or parsing, the NLP mechanisms determine the sentence constituents and the hierarchical sentence structure using word order, number agreement, case agreement, and/or grammars. In semantic analysis, the NLP mechanisms determine the meaning of the sentence from extracted clues within the textual content. With many sentences being ambiguous, the NLP mechanisms may look to the specific actions being performed on specific objects within the textual content. Finally, in pragmatic analysis, the NLP mechanisms determine an actual meaning and intention in context (of speaker, of previous sentence, etc.). These are only some aspects of NLP mechanisms. Many different types of NLP mechanisms exist that perform various types of analysis to attempt to convert natural language input into a machine-understandable set of data.

Modern NLP algorithms are based on machine learning, especially statistical machine learning. The paradigm of machine learning is different from that of most prior attempts at language processing, in that prior implementations of language-processing tasks typically involved the direct hand-coding of large sets of rules, whereas the machine-learning paradigm calls instead for using general learning algorithms (often, although not always, grounded in statistical inference) to automatically learn such rules through the analysis of large corpora of real-world examples. A corpus is a set of documents (or sometimes, individual sentences) that have been annotated with the correct values to be learned.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method comprising: Generating a training set by: (a) obtaining multiple arguments, each comprising one or more sentences provided as digital text, (b) automatically estimating a probability that each of the arguments includes reasoning, wherein the estimating comprises applying a contextual language model to each of the arguments, (c) automatically labeling as positive examples those of the arguments which have a relatively high probability to include reasoning, (d) automatically labeling as negative examples those of the arguments which have a relatively low probability to include reasoning. Based on the generated training set, automatically training a machine learning classifier to estimate a probability that a new argument includes reasoning.

Another embodiment is directed to a system comprising: at least one hardware processor, and a non-transitory computer-readable storage medium having program code embodied therewith, the program code executable by said at least one hardware processor to: Generate a training set by: (a) obtaining multiple arguments, each comprising one or more sentences provided as digital text, (b) automatically estimating a probability that each of the arguments includes reasoning, wherein the estimating comprises applying a contextual language model to each of the arguments, (c) automatically labeling as positive examples those of the arguments which have a relatively high probability to include reasoning, (d) automatically labeling as negative examples those of the arguments which have a relatively low probability to include reasoning. Based on the generated training set, automatically train a machine learning classifier to estimate a probability that a new argument includes reasoning.

A further embodiment relates to a computer program product comprising a non-transitory computer-readable storage medium having program code embodied therewith, the program code executable by at least one hardware processor to: Generate a training set by: (a) obtaining multiple arguments, each comprising one or more sentences provided as digital text, (b) automatically estimating a probability that each of the arguments includes reasoning, wherein the estimating comprises applying a contextual language model to each of the arguments, (c) automatically labeling as positive examples those of the arguments which have a relatively high probability to include reasoning, (d) automatically labeling as negative examples those of the arguments which have a relatively low probability to include reasoning. Based on the generated training set, automatically train a machine learning classifier to estimate a probability that a new argument includes reasoning.

In some embodiments, the method further comprises, or the program code is further executable by said at least one hardware processor, to: apply the trained machine learning classifier to the new argument, to estimate a probability that the new argument includes reasoning.

In some embodiments, at least some of the arguments lack any conjunction that linguistically precedes a reasoning.

In some embodiments, at least some of the arguments include an equivocal conjunction that can either linguistically precede a reasoning or have a meaning unrelated to reasoning.

In some embodiments, the contextual language model is a masked language model, and wherein the estimating of the probability that each of the arguments includes reasoning comprises: generating multiple variations of each of the arguments by inserting a placeholder between every pair of consecutive words in each of the arguments, such that each of the variations includes one placeholder; using the masked language model to predict terms that can linguistically replace each of the placeholders, and to provide a probability for each replacement; identifying, among the predicted terms, conjunctions that exist in a reasoning lexicon, wherein the reasoning lexicon comprises conjunctions that linguistically precede reasoning; and assigning a single probability to each of the arguments, based on the probabilities for replacement by the identified terms, wherein the labeling of arguments as positive and negative examples is based on the single probabilities of each of the arguments.

In some embodiments, the generating of the multiple variations of each of the arguments is further by: replacing every equivocal conjunction, that can either linguistically precede a reasoning or have a meaning unrelated to reasoning, with a placeholder.

In some embodiments of the method, the generating and the training are performed by at least one hardware processor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Automated detection of reasoning in arguments is disclosed herein. Given an argument, namely—a sentence including assertion of fact or opinion, a trained machine learning classifier estimates a probability that the argument includes reasoning. For example, the machine learning classifier may correctly estimate that there is a relatively high (or absolute) probability that the argument "video games are bad for you, they can become addictive" includes reasoning, while the argument "video games are bad for you, period" has a relatively low (or zero) probability to include reasoning. While the first argument reasons that "video games are bad for you" because "they can become addictive," the second arguments does not reason its assertion regarding video games.

Advantageously, the present machine learning classifier is able to detect reasoning that is only implied in an argument, even if that reasoning does not use any explicit conjunctions that typically precede reasoning, such as "because," "due to," "the reason is," etc. For example, the argument "video games are bad for you, they can become addictive" can correctly be estimated by the present machine learning classifier to include reasoning ("they become addictive"), despite lacking the conjunction "because" before the reasoning. Similarly, the present machine learning classifier may also be able to detect reasoning which is expressed by equivocal conjunctions, such as "since" or "as," which sometimes precede a reasoning in a sentence but are sometimes used to refer to something temporal.

The present machine learning classifier is able to reliably perform these estimations due its training on a training set that is advantageously generated by the following weakly-supervised approach: First, multiple arguments are obtained. Each argument includes one or more sentences that are provided as digital text. Then, a probability that each of the arguments includes reasoning is estimated by, inter alia, applying a contextual language model to each of the arguments. Then, those of the arguments which have a relatively high probability to include reasoning are labeled as positive examples, and those having a relatively low probability to include reasoning are labeled as negative examples. The machine learning classifier is then trained based on this training set of positively- and negatively-labeled examples. The trained machine learning classifier can then be applied to any newly-provided argument, in order to estimate a probability that the new argument includes reasoning.

Figure 1:
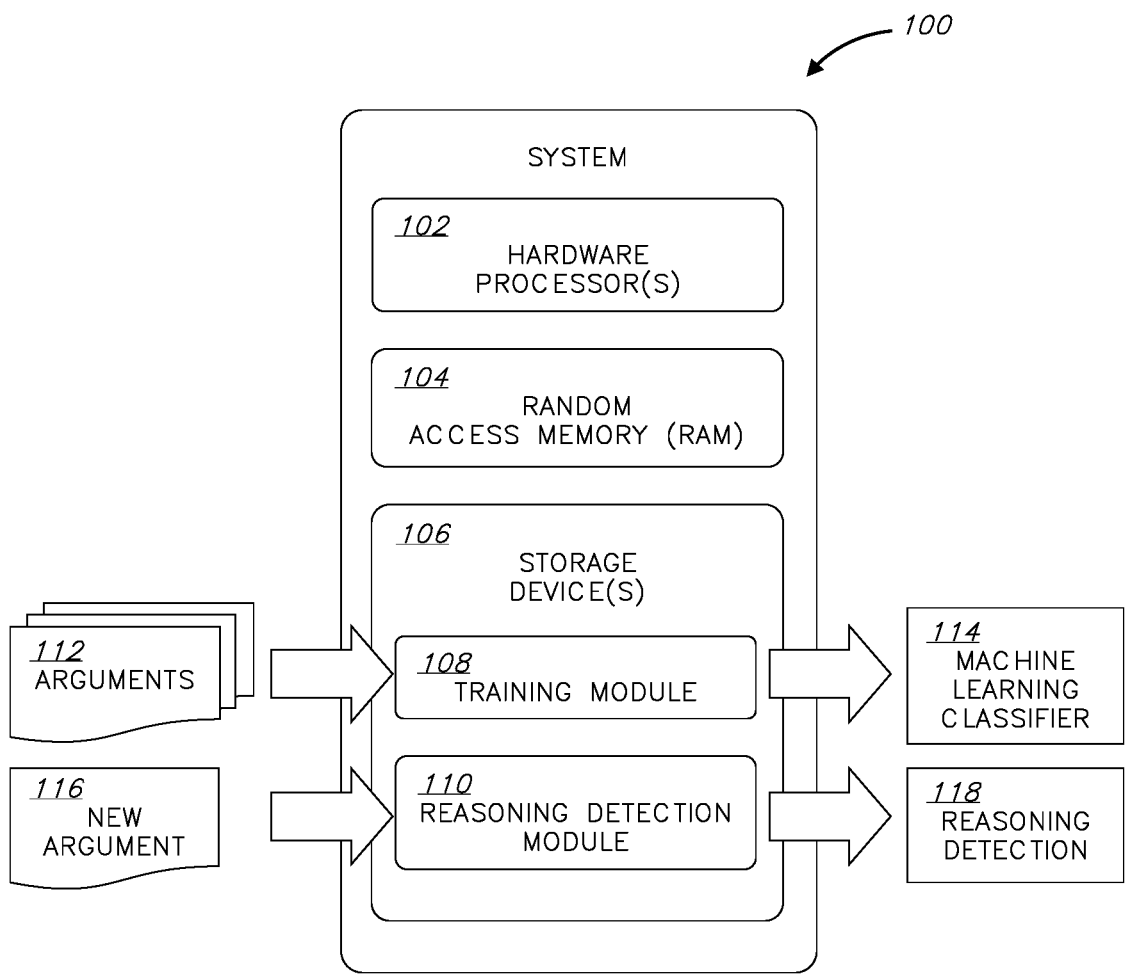
FIG. 1 is a block diagram of an exemplary system for automated detection of reasoning in arguments, according to an embodiment.

Reference is now made to FIG. 1, which shows a block diagram of an exemplary system 100 for automated detection of reasoning in arguments, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to be executed by hardware processor(s) 102. The program instructions may include one or more software modules, such as a training module 108 and a reasoning detection module 110. The software components may include an operating system having various software components and/or drivers for controlling and managing general system tasks (e.g., memory management, storage device control, power management, etc.), and facilitating communication between various hardware and software components.

System 100 may operate by loading instructions of training module 108 and reasoning detection module 110 into RAM 104 as they are being executed by processor(s) 102. The instructions of training module 108 may cause system 100 to obtain multiple arguments 112, process them, and train a machine learning classifier 114 based on them. This trained machine learning classifier 114 may then be implemented in reasoning detection module 110, whose instructions may cause system 100 to apply the trained machine learning classifier to a new argument 116, thereby estimating a probability that a new argument includes reasoning 118. This probability estimation is also referred to herein as "reasoning detection."

While training module 108 and reasoning detection module 110 may be included in a single system 100 as shown in FIG. 1, them may alternatively be divided between multiple such computer systems. For example, training module 108 may be included in a first computing system operated by a software provider, and reasoning detection module 110 in a computing system operated by an end-user wishing to detect reasoning in various arguments. Similarly, reasoning detection module 110 may be included in a cloud computing platform which enables end-users to detect reasoning in arguments by accessing the cloud computing platform through a computer network, in a SaaS (Software-as-a-Service) model.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (all not shown). Components of system 100 may be co-located or distributed (e.g., in a distributed computing architecture).

Figure 2:
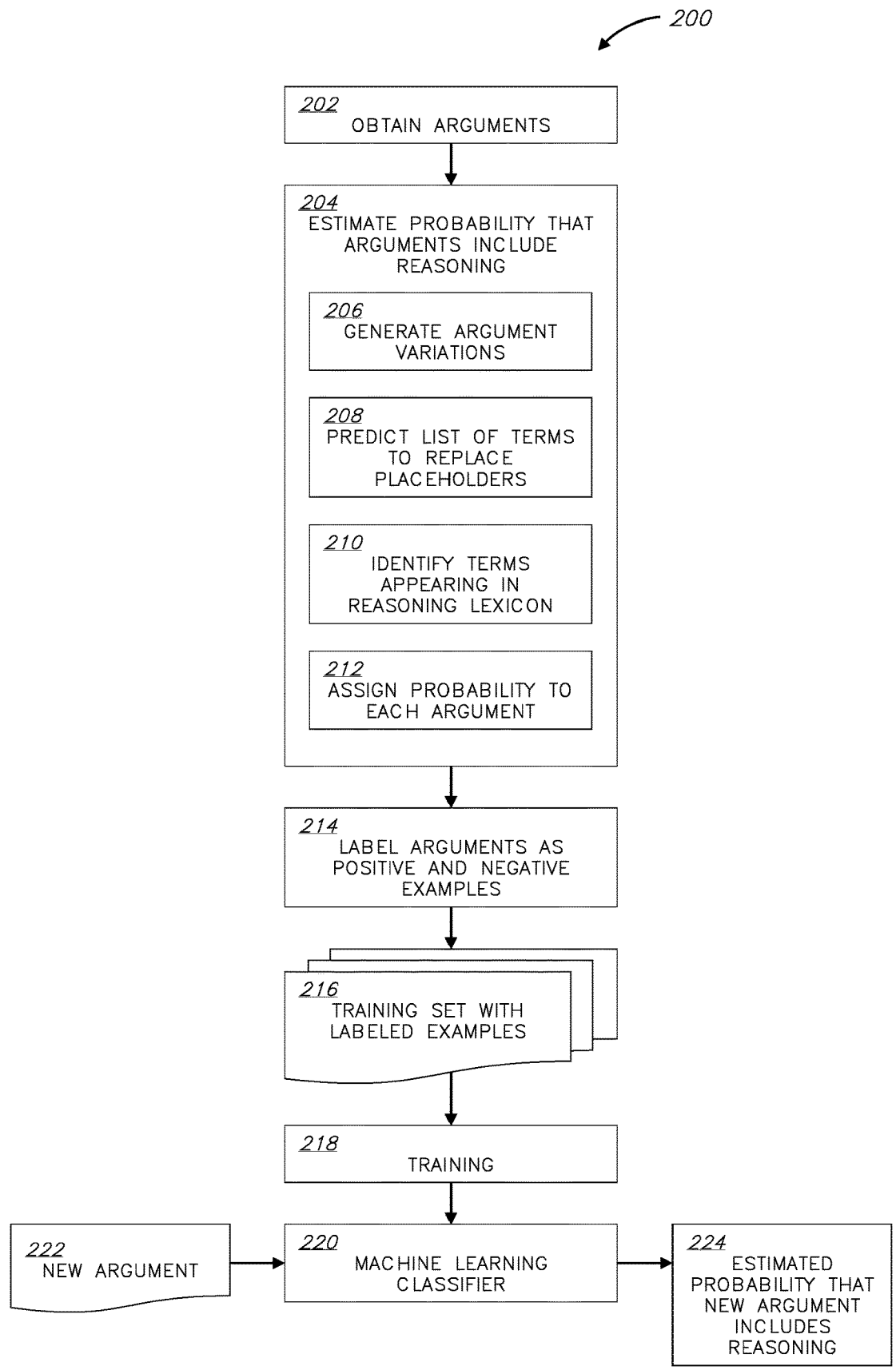
FIG. 2 is a flowchart of a method for automated detection of reasoning in arguments, according to an embodiment.

The instructions of training module 108 and reasoning detection module 110 are now discussed with reference to the flowchart of FIG. 2, which illustrates a method 200 for automated detection of reasoning in arguments, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

Steps 202-214 of method 200 may include the generation of a training set 216, as follows:

In step 202, multiple arguments are obtained in the form of digital text which enables their processing in a computer system, such as system 100 of FIG. 1. The term "argument," as referred to herein, is to have the meaning attributed to in the field of natural linguistics, namely—a textual assertion of fact or opinion. The assertion may be for or against a topic. For example, the sentences "Video games are highly-addictive" and "Video games should be promoted, because they lower the risk for neurodegenerative disease" are examples of arguments for and against the topic of video games, respectively.

An argument is typically a single sentence, but arguments comprised of two (or more) sentences may also be obtained. For example, a two-sentence argument may be "Video games should be banned. They cause dopamine secretion, which in turn promotes addiction." In this example, the second sentence is the one providing the reasoning for the argument.

The arguments, or some of them, may lack any conjunction that, from a linguistics perspective, typically precedes a reasoning. For example, the arguments may lack any of the following conjunctions: "because," "due to," "for the reason that," "the reason is," "the reason being," "by reason of," "by virtue of," "caused by," "by cause of," "owing to," "thanks to," "in view of," "on the grounds that," or any other conjunction, in any language, that typically precedes a reasoning inside a sentence.

Additionally or alternatively, the arguments, or some of them, may only include an equivocal conjunction that can either linguistically precede a reasoning or have a meaning unrelated to reasoning. For example, conjunctions such as "since," "as," "considering," and "for" may either precede a reasoning (e.g., "video games are bad since they promote addiction," "video games are bad, for they promote addiction") or have an unrelated meaning such as temporal or other meaning (e.g., "video games have been bad as of the 1980s," "video games are bad for teenagers"). Any other such equivocal conjunction, in any language, may exist in some or all of the arguments.

In some languages, or in some special cases, conjunctions may appear following a reasoning and not before the reasoning—as linguistically appropriate in that language or special case.

In step 204, a probability that each of the arguments includes reasoning is estimated. The estimation may include application of a contextual language model to each of the arguments or to variations thereof, in order to estimate the probability that these arguments are each simply missing a conjunction that typically precedes a reasoning, such as "because," "due to," etc., and that, had such conjunction existed in the original argument, its meaning would have been the same.

The term "contextual language model," as used herein, may refer to any machine learning-based model that is configured to estimate (sometimes referred to in the art as "predict") one or more words missing from a text, based on a contextual understanding of earlier and/or later parts of that text.

For example, one suitable contextual language model is a masked language model, such as the Bidirectional Encoder Representations from Transformers ("BERT") discussed in J. Devlin et al., "BERT: Pre-training of Deep Bidirectional Transformers for Language Understanding," arXiv: 1810.04805v2 [cs.CL], May 24, 2019. Another suitable contextual language model is known as a "next word(s) predictor," "context completion algorithm," or the like, and works by suggesting a next word (or multiple words) to follow a sequence of provided words (or a single word that starts a sentence).

The estimation of step 204 may involve sub-steps 206-212 which, for simplicity of demonstration, discuss an estimation technique that is based on a masked language model such as BERT. However, those of skill in the art will recognize that any other suitable contextual language model may be used instead.

In sub-step 206, multiple variations of each of the arguments may be generated, by inserting a placeholder between every pair of consecutive words in each of the arguments. Each of the variations includes one such placeholder, so that the total number of variations is the number of words in the argument minus one. Also, optionally, any equivocal conjunction appearing in an argument may be replaced with a placeholder, to form another variation of the respective argument. Finally, another option is to also replace any mid-sentence punctuation mark (e.g., comma, colon, semi-colon, dash, etc.) with a placeholder.

For example, the following variations may be generated for the argument "Video games are bad, as they are addictive," which includes one equivocal conjunction ("as") and one mid-sentence punctuation mark (comma):

1. Video [placeholder] games are bad, as they are addictive.
2. Video games [placeholder] are bad, as they are addictive.
3. Video games are [placeholder] bad, as they are addictive.
4. Video games are bad [placeholder] as they are addictive.
5. Video games are bad, [placeholder] as they are addictive.
6. Video games are bad, [placeholder] they are addictive.
7. Video games are bad, as [placeholder] they are addictive.
8. Video games are bad, as they [placeholder] are addictive.
9. Video games are bad, as they are [placeholder] addictive.

The term "placeholder" is to be interpreted as any type of indicia which the pertinent contextual language model is configured to accept.

Then, in sub-step 208, the masked language model may be used to predict, for each of the variations, a list of terms (single words or multi-word terms) that can linguistically replace each of the placeholders. The masked language model may also produce, for each such predicted term, a score denoting the probability of it replacing the placeholder. The masked language model does that based on its training on a vast amount of natural language texts.

For example, for the sixth exemplary variation above ("Video games are bad, [placeholder] they are addictive"), the masked language model may output the following list of terms and probabilities: "but"=0.1, "because"=0.07, "and"=0.03, "due to the fact"=0.03, "therefore"=0.01. Note that the probabilities may be given on any scale, but a scale in the interval [0,1] is the one most common in the machine learning field and is therefore used in this example.

In sub-step 210, the terms predicted by the masked language model (e.g., "but," "because," "and," "due to the fact," and "therefore") are compared against a reasoning lexicon, to identify words appearing in both. The reasoning lexicon contains conjunctions that, linguistically, typically precede reasoning. A reasoning lexicon may be provided for the specific language for which method 200 is executed. For example, for the English language, the reasoning lexicon may include some or all of the following conjunctions, and possibly additional ones: "because," "due to," "for the reason that," "the reason is," "the reason being," "by reason of," "by virtue of," "caused by," "by cause of," "owing to," "thanks to," "in view of," "on the grounds that," as well as any derivations, inflections, and extensions thereof. Note that the conjunctions in the reasoning lexicon are not those which are equivocal, such as "since" or "as," but rather ones which explicitly and unequivocally denote a reasoning.

In sub-step 212, a single probability, expressed as a numerical score, may be assigned to each argument, based on the individual probabilities associated with the identified words in all variations of that arguments. For example, in the sixth exemplary variation above ("Video games are bad, [placeholder] they are addictive"), the terms "because" and "due to the fact" are detected in the reasoning lexicon. Since the term "because" has a higher probability (0.07) than "due to the fact" (0.03), that higher probability (0.07) may be attributed to the entire variation. Alternatively, the probabilities of the detected terms may be averaged or otherwise fused, to yield one probability that represents that variation. All the other variations are similarly processed, and the maximal probability among them may be assigned as the probability of the argument. For example, assuming that the sixth exemplary variation was assigned with a probability of 0.07, and the remaining eight variations had lower probabilities (e.g., 0.06, 0.05, 0.05, 0.02 0.015, 0.01, 0.008), then the 0.07 probability is the one assigned to the argument "Video games are bad, as they are addictive." Alternatively, the probabilities of the variations may be averaged or otherwise jointly processed, to yield one probability that represents the pertinent argument.

Then, in step 214, a group of the arguments having the highest probabilities may be labeled as the positive examples, and a group having the lowest probabilities may be labeled as the negative examples. The amount of arguments labeled as positive and negative may be determined, for example, by a predefined number (e.g., the X arguments having the highest probabilities, and the X arguments having the lowest probabilities), or by a predefined percentage (e.g., the top Y % of probabilities, and the bottom Y % of probabilities). The predefined percentage (Y) may be, for example, in the range of 5-25%. The two groups should have probabilities sufficiently far apart, so that they indeed represent polar examples of arguments very likely to include reasoning, and arguments very unlikely to include reasoning. Optionally, the amount or percentage of arguments labeled as positive and negative is set empirically, by testing method 200 with different amounts/percentages and choosing the one with the best precision-recall performance, or one selected as proper by a user based on other criteria.

As sub-step 214 concludes, a training set 216 with positively- and negatively-labeled arguments is provided. Optionally, training set 216 includes at least 1000, 2000, 3000, 4000, 5000, 6000, 7000, 8000, 9000, or more arguments of each label, in order for the machine learning classifier trained based on this set to be sufficiently robust.

As noted above, the estimation in step 204 of the probability that each of the arguments includes reasoning, may be performed using any contextual language model. Sub-steps 206-216 exemplified usage of a masked language model, such as BERT. If a context completion algorithm is to be used instead, sub-steps 206-216 may be performed slightly differently: The variations of each argument may be generated as follows, differently than in sub-step 206: A first variation includes only the first word of the argument, a second variation includes only the first two words of the argument, and so on. Optionally, punctuation marks are treated as words. When a context completion algorithm is applied so each such variation, somewhat differently than sub-step 208, it provides a list of terms, along with probabilities, that may form the next word(s) in the argument. Then, as in sub-step 210, terms that also appear in the reasoning lexicon are identified. The identified term having the highest probability provides the probability for that variation (or, averaging/other fusion may be used, as above). As in sub-step 212, the highest probability among all variations of a certain argument provides the probability of the argument (or, averaging may be used, as above). Finally, like in sub-step 214, positive and negative examples are labeled.

The context completion algorithm may, alternatively, be one which completes the previous word in a partial sentence, instead of the next word. When such an algorithm is used, the generation of the variations of each argument is performed in the opposite manner: A first variation includes all but the first word of the argument, a second variation includes all but the first two words of the argument, and so on. Optionally, punctuation marks are treated as words. It is also possible to combine these two types of context completion algorithms (next/previous word prediction), in order to increase the amount of generated variations.

In step 218, once training set 216 is ready, it serves as a basis for training a machine learning classifier 220. The training may be performed in a manner known in the art, and the machine learning classifier may be based on any suitable supervised machine learning algorithm/model, such as Support Vector Machine (SVM), logistic regression, naïve Bayes, neural networks (e.g. Convolutional Neural Networks, Recurrent Neural Networks), etc.

Machine learning classifier 220 may then be applied to any newly-provided argument 222, in order to estimate a probability that the new argument includes reasoning 224.

Experimental Results

Experimentation with the present method for automated detection of reasoning in arguments was conducted on a corpus of approximately 6500 arguments, of which 80% were used for a training set, 5% for a validation set, and 15% for a test set. Forty percent of the arguments did not include reasoning and the remaining 60% included implicit reasoning (without any terms from a reasoning lexicon, and some having equivocal terms that may or may not indicate reasoning).

BERT was used as the contextual language model, to both predict terms to replace placeholders that were placed between every pair of consecutive words, and terms to replace placeholders that have substituted equivocal terms.

Training of the machine learning classifier was also performed with BERT, using its built-in "fine-tuning" functionality which is based on a neural network model.

Figure 3:
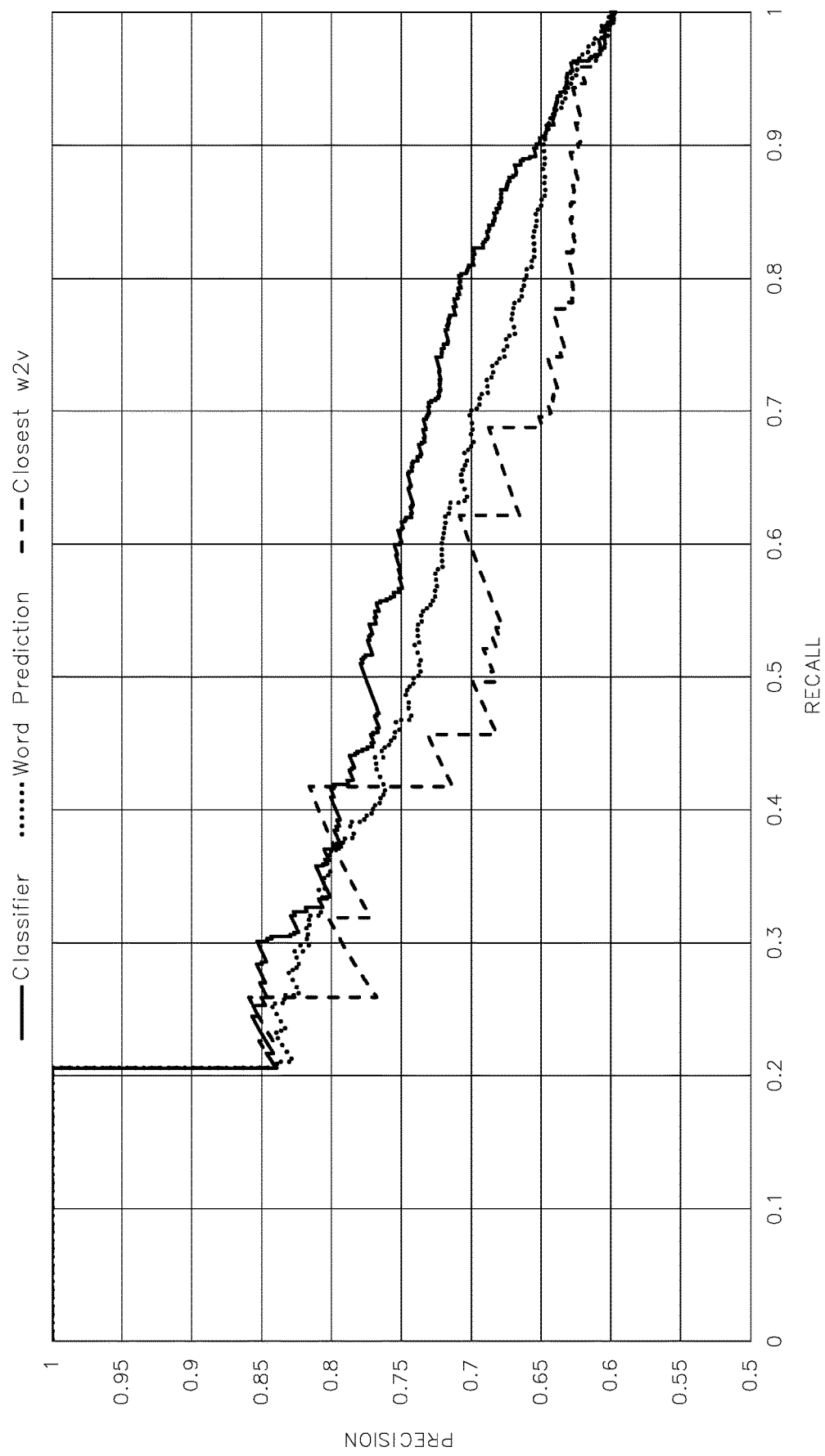
FIG. 3 is a precision-recall graph illustrating experimental results.

Then, the trained machine learning classifier was applied to the test portion of the corpus, yielding the precision-recall graph labeled "classifier" in FIG. 3. Also shown in this figure are graphs labeled "word prediction" and "closest w2v," indicating precision-recall results for two comparative techniques.

The first technique, "word prediction," estimated the probability that each argument in the test set includes reasoning in a rather naïve manner, by performing only steps 206-212 of method 200 (FIG. 2); the probability for each argument was simply the maximal probability among reasoning lexicon words found in that argument's variations, as in step 212.

The second technique, "closest w2v," included the following steps: each of the arguments was processed by the well-known word2vec algorithm (T. Mikolov et al., "Distributed Representations of Words and Phrases and their Compositionality," Advances in Neural Information Processing Systems 26 (NIPS 2013); and T. Mikolov et al., "Efficient Estimation of Word Representations in Vector Space," arXiv:1301.3781v3 [cs.CL], Sep. 7, 2013). This yielded a word embedding for each word in the arguments. Then, cosine similarity between the embedding for the word "because" and each of the word embeddings of the arguments was calculated. The maximal cosine similarity found in each of the arguments served as the probability that the respective argument includes reasoning; high similarity means that one of the argument's words is contextually similar to "because," and low similarity means that none of the argument's words is contextually similar to "because."

As can be seen in FIG. 3, the precision-recall performance of the present method for automated detection of reasoning in arguments (labeled "classifier") demonstrated superior precision for the vast majority of recall data points.

The present invention may be a system, a method, and/or a computer program product. The computer program product may include a computer readable storage medium (or media) having computer readable program instructions thereon for causing a processor, such as a Central Processing Unit (CPU) or an Application-Specific Integrated Circuit (ASIC) to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a portable memory stick, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++, Python, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   generating a training set by:
     obtaining multiple arguments, each comprising one or more sentences provided as digital text,
     automatically estimating a probability that each of the arguments includes reasoning, wherein the estimating comprises applying a contextual language model to each of the arguments, and wherein the contextual language model comprises a machine learning-based model that is configured to estimate one or more words missing from each of the arguments,
     automatically labeling as positive examples members of a first group of the arguments, wherein the members of the first group have probabilities within a first numerical range,
     automatically labeling as negative examples members of a second group of the arguments, wherein the members of the second group have probabilities within a second numerical range,
     wherein the first numerical range is higher than the second numerical range; and
   based on the generated training set, automatically training a machine learning classifier to estimate a probability that a new argument includes reasoning.

2. The method of claim 1, further comprising:
   applying the trained machine learning classifier to the new argument, to estimate a probability that the new argument includes reasoning.

3. The method of claim 1, wherein at least some of the arguments lack any conjunction that linguistically precedes a reasoning.

4. The method of claim 1, wherein at least some of the arguments include an equivocal conjunction that can either linguistically precede a reasoning or have a meaning unrelated to reasoning.

5. The method of claim 1, wherein the contextual language model is a masked language model, and wherein the estimating of the probability that each of the arguments includes reasoning comprises:
   generating multiple variations of each of the arguments by inserting a placeholder between every pair of consecutive words in each of the arguments, such that each of the variations includes one placeholder;
   using the masked language model to predict terms that can linguistically replace each of the placeholders, and to provide a probability for each replacement;
   identifying, among the predicted terms, conjunctions that exist in a reasoning lexicon, wherein the reasoning lexicon comprises conjunctions that linguistically precede reasoning; and
   assigning a single probability to each of the arguments, based on the probabilities for replacement by the identified terms,
   wherein the labeling of arguments as positive and negative examples is based on the single probabilities of each of the arguments.

6. The method of claim 5, wherein the generating of the multiple variations of each of the arguments is further by:
   replacing every equivocal conjunction, that can either linguistically precede a reasoning or have a meaning unrelated to reasoning, with a placeholder.

7. The method according to claim 1, wherein the generating and the training are performed by at least one hardware processor.

8. A system comprising:
   (a) at least one hardware processor; and
   (b) a non-transitory computer-readable storage medium having program code embodied therewith, the program code executable by said at least one hardware processor to:
     generate a training set by:
       obtaining multiple arguments, each comprising one or more sentences provided as digital text,
       automatically estimating a probability that each of the arguments includes reasoning, wherein the estimating comprises applying a contextual language model to each of the arguments, and wherein the contextual language model comprises a machine learning-based model that is configured to estimate one or more words missing from each of the arguments,
       automatically labeling as positive examples members of a first group of the arguments, wherein the members of the first group have probabilities within a first numerical range, automatically labeling as negative examples members of a second group of the arguments, wherein the members of the second group have probabilities within a second numerical range, wherein the first numerical range is higher than the second numerical range; and based on the generated training set, automatically train a machine learning classifier to estimate a probability that a new argument includes reasoning.

9. The system of claim 8, wherein the program code is further executable by said at least one hardware processor to:

apply the trained machine learning classifier to the new argument, to estimate a probability that the new argument includes reasoning.

10. The system of claim 8, wherein at least some of the arguments lack any conjunction that linguistically precedes a reasoning.

11. The system of claim 8, wherein at least some of the arguments include an equivocal conjunction that can either linguistically precede a reasoning or have a meaning unrelated to reasoning.

12. The system of claim 8, wherein the contextual language model is a masked language model, and wherein the estimating of the probability that each of the arguments includes reasoning comprises:

generating multiple variations of each of the arguments by inserting a placeholder between every pair of consecutive words in each of the arguments, such that each of the variations includes one placeholder;

using the masked language model to predict terms that can linguistically replace each of the placeholders, and to provide a probability for each replacement;

identifying, among the predicted terms, conjunctions that exist in a reasoning lexicon, wherein the reasoning lexicon comprises conjunctions that linguistically precede reasoning; and assigning a single probability to each of the arguments, based on the probabilities for replacement by the identified terms, wherein the labeling of arguments as positive and negative examples is based on the single probabilities of each of the arguments.

13. The system of claim 12, wherein the generating of the multiple variations of each of the arguments is further by:

replacing every equivocal conjunction, that can either linguistically precede a reasoning or have a meaning unrelated to reasoning, with a placeholder.

14. A computer program product comprising a non-transitory computer-readable storage medium having program code embodied therewith, the program code executable by at least one hardware processor to:

generate a training set by:

obtaining multiple arguments, each comprising one or more sentences provided as digital text, automatically estimating a probability that each of the arguments includes reasoning, wherein the estimating comprises applying a contextual language model to each of the arguments, and wherein the contextual language model comprises a machine learning-based model that is configured to estimate one or more words missing from each of the arguments, automatically labeling as positive examples members of a first group of the arguments, wherein the members of the first group have probabilities within a first numerical range, automatically labeling as negative examples members of a second group of the arguments, wherein the members of the second group have probabilities within a second numerical range, wherein the first numerical range is higher than the second numerical range; and based on the generated training set, automatically train a machine learning classifier to estimate a probability that a new argument includes reasoning.

15. The computer program product of claim 14, wherein the program code is further executable by the at least one hardware processor to:

apply the trained machine learning classifier to the new argument, to estimate a probability that the new argument includes reasoning.

16. The computer program product of claim 14, wherein at least some of the arguments lack any conjunction that linguistically precedes a reasoning.

17. The computer program product of claim 14, wherein at least some of the arguments include an equivocal conjunction that can either linguistically precede a reasoning or have a meaning unrelated to reasoning.

18. The computer program product of claim 14, wherein the contextual language model is a masked language model, and wherein the estimating of the probability that each of the arguments includes reasoning comprises:

generating multiple variations of each of the arguments by inserting a placeholder between every pair of consecutive words in each of the arguments, such that each of the variations includes one placeholder;

using the masked language model to predict terms that can linguistically replace each of the placeholders, and to provide a probability for each replacement;

identifying, among the predicted terms, conjunctions that exist in a reasoning lexicon, wherein the reasoning lexicon comprises conjunctions that linguistically precede reasoning; and assigning a single probability to each of the arguments, based on the probabilities for replacement by the identified terms, wherein the labeling of arguments as positive and negative examples is based on the single probabilities of each of the arguments.

19. The computer program product of claim 18, wherein the generating of the multiple variations of each of the arguments is further by:

replacing every equivocal conjunction, that can either linguistically precede a reasoning or have a meaning unrelated to reasoning, with a placeholder.

* * * * *